(12) United States Patent
Davies

(10) Patent No.: US 6,401,557 B1
(45) Date of Patent: Jun. 11, 2002

(54) SCREW ACTUATOR

(75) Inventor: Stephen H Davies, Telford (GB)

(73) Assignee: Lucas Industries Limited (GB)

(*) Notice: Subject to any disclaimer, the term of this patent is extended or adjusted under 35 U.S.C. 154(b) by 0 days.

(21) Appl. No.: 09/570,425

(22) Filed: May 12, 2000

(30) Foreign Application Priority Data

May 14, 1999 (GB) .............................................. 9911150

(51) Int. Cl.$^7$ .............................................. F16H 25/24
(52) U.S. Cl. ...................... 74/89.39; 74/89.15; 192/141
(58) Field of Search .............................. 74/822, 813 L, 74/22 R, 22 A, 27, 89.23, 89.37, 89.38, 89.39, 112, 127, 126, 141; 188/67, 82.1, 82.74, 82.9, 196 V, 196 D; 192/223, 141

(56) References Cited

U.S. PATENT DOCUMENTS

| | | | | |
|---|---|---|---|---|
| 2,447,439 A | * | 8/1948 | Thompson | 74/89.39 |
| 2,479,019 A | * | 8/1949 | Ochtman | 74/89.37 X |
| 2,875,630 A | * | 3/1959 | Gill et al. | 74/89.39 |
| 2,876,653 A | * | 3/1959 | Meyer | 74/89.39 |
| 3,183,733 A | * | 5/1965 | Whicker | 74/89.39 |
| 3,269,199 A | * | 8/1966 | Deehan et al. | 74/89.25 |
| 3,355,959 A | | 12/1967 | Whicker | |
| 4,149,430 A | * | 4/1979 | F'Geppert | 74/411.5 X |
| 4,644,811 A | * | 2/1987 | Tervo | 74/412 TA |
| 4,712,440 A | * | 12/1987 | Rousselot | 74/89.37 X |
| 4,834,225 A | * | 5/1989 | Klopfenstein et al. | 74/89.39 X |
| 5,295,406 A | * | 3/1994 | Alfano | 74/89.39 |
| 5,467,661 A | * | 11/1995 | Lange | 74/441 |
| 6,158,295 A | * | 12/2000 | Nielsen | 74/89.38 |

FOREIGN PATENT DOCUMENTS

| | | |
|---|---|---|
| DE | 41 41 460 | 6/1993 |
| FR | 821 265 | 12/1937 |
| FR | 1 394 136 | 7/1965 |
| JP | 62-261720 | * 11/1987 |

* cited by examiner

Primary Examiner—David A. Bucci
Assistant Examiner—Colby Hansen
(74) Attorney, Agent, or Firm—Andrus, Sceales, Starke & Sawall

(57) ABSTRACT

A screw actuator comprising first and second relatively rotatable members, a screw thread formation in the first member including a helical groove, spherical elements carried by the second member and in rolling engagement in the helical groove to form a ball screw coupling between the first and second members, the groove being of sufficient width to allow the spherical elements to move laterally within the groove, and a brake member carried by the second member and defining a screw thread formation which is received in the groove of the screw thread formation of the first member, the brake member being angularly moveable relative to the second member by rotation of the first member relative to the second member, between a first angular position in which the screw thread formation of the brake member is cooperable with that of the first member, and a second angular position in which the screw thread formation of the brake member is not cooperable with that of the first member.

2 Claims, 2 Drawing Sheets

SCREW ACTUATOR

This invention relates to a screw actuator of the type in which a first component is rotatable, a second component being held non-rotatably, the first and second components cooperating with one another such that rotation of the first component causes the second component to move axially relative to the first component.

In some applications, for example where the actuator is used to move a cowl of a thrust reverser system, the actuator may, under some circumstances, have applied thereto an assisting or aiding load or force. It is desirable to avoid transmitting such loads or forces to the motor used to drive the actuator. It is an object of the invention to provide an actuator in which the disadvantage described hereinbefore is of reduced effect.

According to the present invention there is provided a screw actuator comprising first and second relatively rotatable members, a screw thread formation in said first member including a helical groove, spherical elements carried by the second member and in rolling engagement in said helical groove to form a ball screw coupling between the first and second members, said groove being of sufficient width to allow the spherical elements to move laterally within the groove, and a brake member carried by the second member and defining a screw thread formation which is received in said groove of the screw thread formation of the first member, the brake member being angularly moveable relative to the second member by rotation of the first member relative to the second member, between a first angular position in which the screw thread formation of the brake member is cooperable with that of the first member, and a second angular position in which the screw thread formation of the brake member is not cooperable with that of the first member.

Preferably said brake member will occupy said first angular position in response to rotation of the first member relative to said second member in one direction and during such rotation the thread formation of the brake member will brakingly engage the thread formation of the first member when the actuator is subject to an axial load in one direction but not when the actuator is subject to an axial load in the opposite direction, and, said brake member will occupy said second angular position in response to rotation of the first member relative to said second member in the opposite direction and during such rotation the thread formation of the brake member will not brakingly engage the thread formation of the first member irrespective of the direction in which axial load is imposed on the actuator.

In such an arrangement, during rotation of the first member in the said one direction, whilst a compressive load is applied to the actuator as would occur when the actuator is driving a thrust reverser cowl out of its stowed position, the reaction force to the compressive load is transmitted through the spherical elements and the ball screw coupling provides an efficient drive between the first and second members. In the event that a tensile load is applied to the actuator, for example as a result of the cowl applying an aiding or assisting load to the actuator, the reaction force to the tensile load is applied through the brake member, and the effect of friction between the brake member and the first member will cause the actuator to operate less efficiently. As a result, the aiding or assisting load is not transmitted through the actuator to an extent sufficient to drive and cause damage to the motor.

When the first member is rotated relative to the second member in the reverse direction, the brake member moves to an angular position in which the thread formation thereof is either out of contact with the thread formation of the first member or is free to slide, with little resistance, relative to the thread formation of the first member, and the drive will be relatively efficient regardless as to the direction of any load applied to the actuator as the reaction force to any such load will be applied through the spherical elements.

The invention will further be described, by way of example, with reference to the accompanying drawings, in which.

Figure 1:
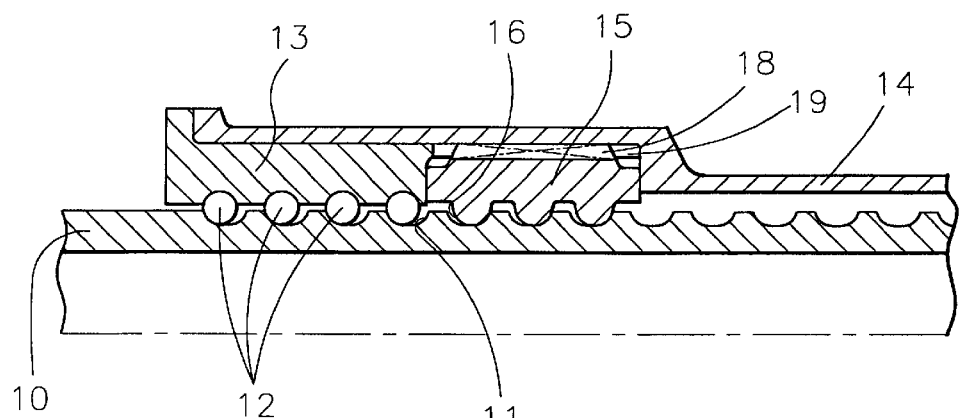
FIG. 1 is a diagrammatic sectional view of an actuator in accordance with an embodiment of the invention in one mode of operation.

The accompanying drawings illustrate part of a rotary actuator which comprises a first, tubular member 10 which is arranged to be rotated, in use, by an appropriate motor (not shown) through a suitable gearing arrangement, if required. The first member 10 is secured, in use, to a part of an aircraft such that the first member is free to rotate but cannot move in an axial direction, or such axial movement is limited. The first member 10 is provided, on its outer surface, with a helical groove defining a screw thread formation 11 within which a series of spherical elements 12 are received, the elements 12 being carried by a carriage 13 which is secured to a second member 14. The second member 14 is secured, in use, to a cowl forming part of a thrust reverser arrangement (not shown) such that the second member 14 is non-rotatable and such that translational movement of the second member 14 causes movement of the cowl between a stowed position and a deployed position.

It will be recognized that the parts 10–13 define a high efficiency ballscrew arrangement in which rotation of the member 10 relative to the carriage 13 results in axial movement (translation) of the carriage 13 relative to the member 10. A difficulty is that the efficiency is so high that if the carriage 13 is pulled axially relative to the member 10 then the member 10 can be caused to rotate. In use therefore if member 10 is being drive by a motor and the load on the carriage 13 is reversed, the carriage load could be applied to the motor as a rotational load tending to increase the speed of rotation of the motor. The construction hereinafter described seeks to minimize this difficulty.

The actuator further comprises a brake member 15 in the form of an annular member including a thread formation 16 which is arranged to cooperate with the thread formation 11 provided on the first member 10. As is clear from the drawings the brake member 15 is trapped axially within the member 14 between the carriage and internal end wall of the member 14. The brake member 15 is supported in the member 14 for angular movement relative thereto and a stop arrangement is provided to define clockwise and anticlockwise limits of the permitted angular movement of the brake member 15 relative to the second member 14.

Figure 5:
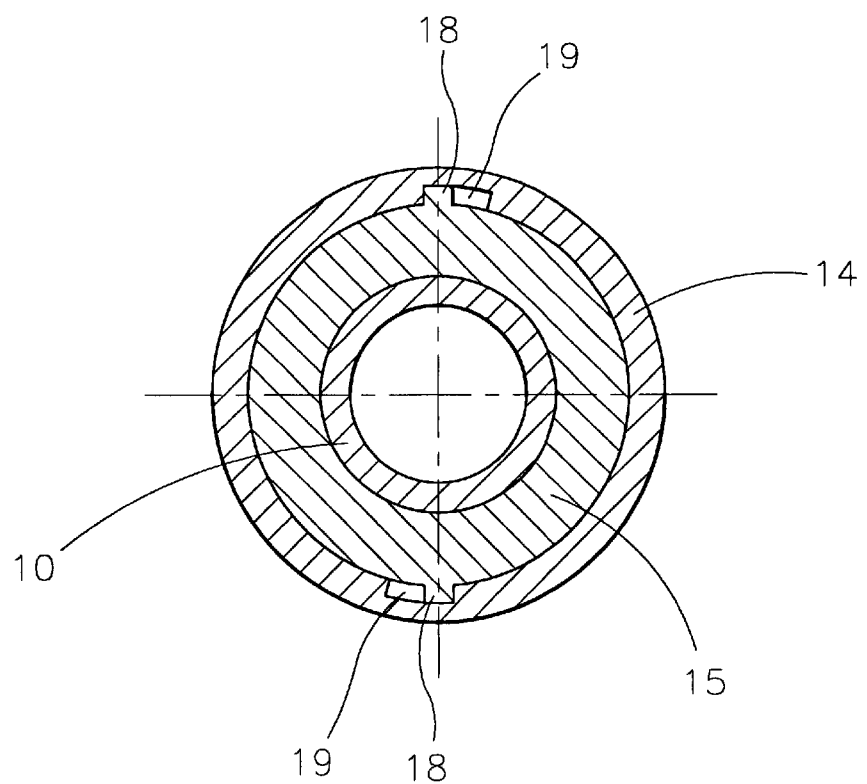
FIG. 5 is a sectional view along the line 5—5 of FIG. 4.

As illustrated in FIG. 5, the stop arrangement may comprise a pair of outwardly extending projections 18 provided on the brake member 15, the projections 18 being received within arcuate recesses provided in the second member 14, the ends of the recesses 19 defining abutment surfaces with which the projections 18 are engageable to limit angular movement of the brake member 15 relative to the second member 14.

As can be seen in the accompanying drawings the diameter of the elements 12 is similar to the width of the thread formation 16 of the member 15, and both are significantly narrower than the width of the groove of the thread formation 11 in the member 10. The groove in the carriage 13 within which the elements 12 are received is of a width corresponding to the diameter of the elements 12. It can be seen that the carriage 13 and the brake member 15 are both axially fixed in position relative to each other and to the member 14 although as mentioned above the brake member 15 can rotate within the member 14 through a limited angular extent. As the member 10 rotates within the member 14 (the member 14 and therefore the carriage 13 being fixed against rotation) drag between the thread formation 16 and the thread formation 11 rotates the member 15 to one angular limit position within the member 14. Assuming that the member 10 is being rotated in a direction to deploy the associated cowl from its stowed position, then the load imposed by the cowl will resist axial movement of the member 14 to the right in the drawings and the elements 12 will bear against the left hand flanks of the formation 11 as the member 10 rotates. The axial relationship between the elements 12 and the formation 16 is such that in this operative configuration of the actuator the formation 16 is close to, and perhaps lightly bearing against, the right hand flank of the formation 11. However, no load is being transmitted through the formation 16 and thus the brake member 15 does not impede rotation of the member 10 relative to the member 14 and the high efficiency ballscrew 11-13 accepts the load urging the member 14 to the left relative to the member 10.

If, while the components of the actuator are in the above configuration (FIG. 2) the axial loading on the member 14 is reversed (FIG. 3) so that the member 14 is actually urged to the right while it is being driven to the right by the rotation of the member 10 (as can occur as a result of the air flow over the cowl assisting deployment of the cowl) then although there will be only a very fractional movement of the member 14 to the right relative to the member 10, the formation 16 on the brake member 15 will bear against the right hand flank of the formation 11 and frictional drag between the formation 16 and the formation 11 will prevent, or greatly minimize, the possibility of the reversed load on the member 14 being transferred back to the motor by way of rotation of the shaft 10. In effect therefore although the air flow over the cowl may assist the deployment of the cowl this assistance will not be transferred back to the motor to cause the motor to increase its operational speed, since the formation 16 will act as a brake.

It will be recognized therefore that during deployment the high efficiency ballscrew 11–13 translates rotational movement of the member 10 into axial movement of the member 14 and thus can efficiently provide the high initial force necessary to commence deployment of the cowl. However, should the axial loading on the member 14 reverse then the brake member 15 will prevent or minimize the risk of, the load being transferred back to the motor by rotation of the member 10.

Figure 2:
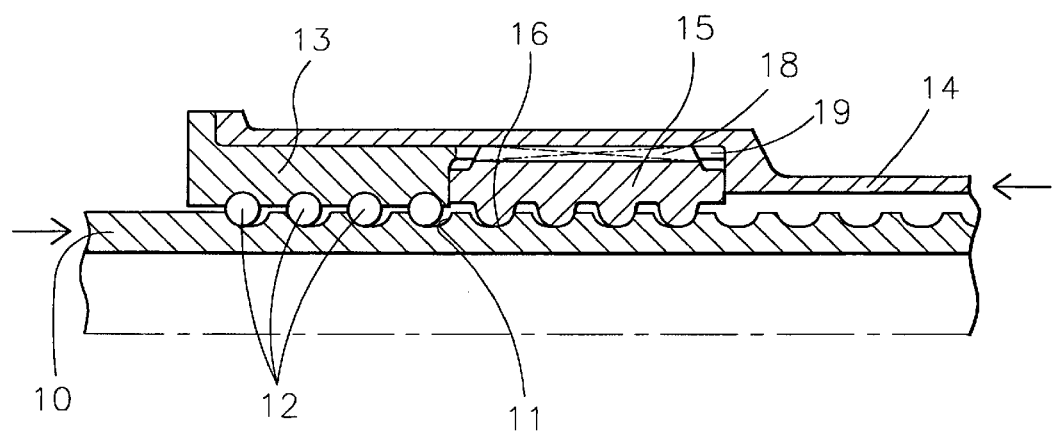
FIGS. 2 and 3 are diagrams illustrating operation of the actuator.
Figure 3:
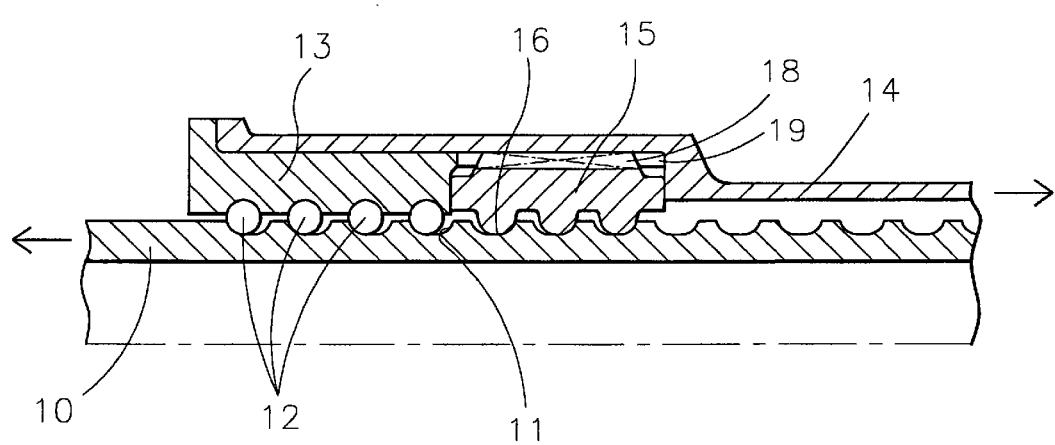

As illustrated in FIG. 3, in the event that an assisting or aiding load is applied to the actuator, then instead of the actuator being under compression as illustrated in FIG. 2, the actuator will be under tension. As a result, the reaction force to the tensile load will be applied through the screw thread formation 16 of the brake member 15 rather than through the spherical elements 12. In such circumstances, the actuator operates relatively inefficiently, and the braking load which is applied as a result of the reaction force being transmitted through the screw thread formation 16 of the braking element 15 ensures that the motor which is used to drive the first member 10 still sees a positive load rather than an aiding or assisting load.

Figure 4:
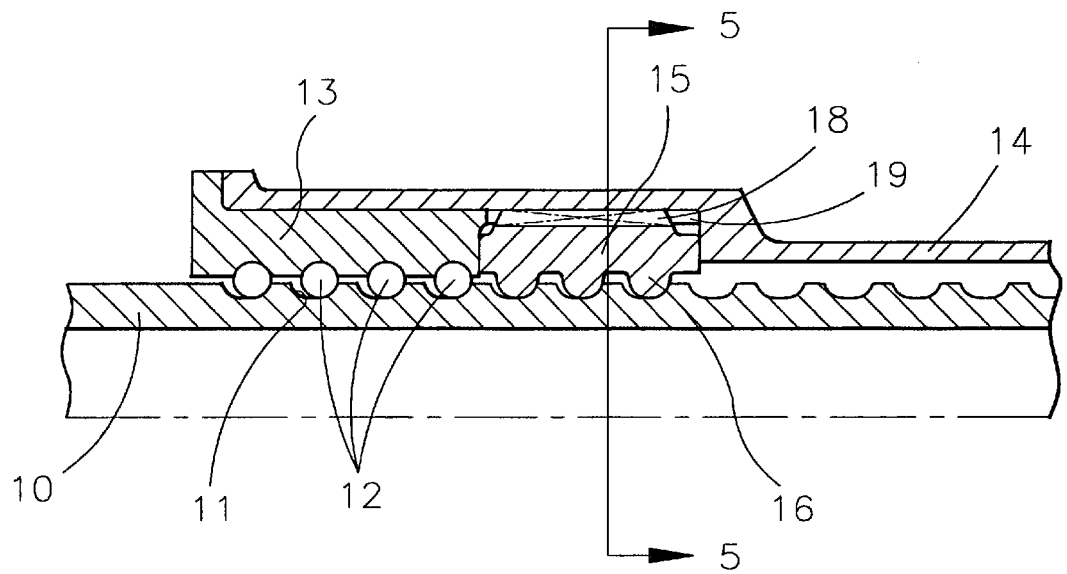
FIG. 4 is a view similar to FIG. 1 illustrating the actuator in another mode of operation.

As illustrated in FIG. 4, when the thrust reverser cowl is to be returned from its deployed position to its stowed position, the first member 10 is rotated in the reverse direction. The rotation of the first member 10 in the reverse direction rotates the brake member 15 relative to the second member 14 so that a position can be reached in which the spherical elements 12 engage the right-hand flank of the groove forming the screw thread formation 11 of the first member 10, and in which the screw thread formation 16 of the brake element 15 is held out of bearing engagement with either flank of the screw thread formation 11 of the first member 10 (i.e. the thread formations 11, 16 can slide over one another without applying a significant braking force to the actuator). In these conditions, when the actuator is under tension as would occur in normal use where the cowl is being returned to its stowed position, the actuator still operates efficiently as the reaction force to the tension is transmitted through the spherical elements 12, and not through the screw thread formation 16 of the brake element 15. Similarly, if the actuator were under compression, the reaction to the compression would be transmitted through the spherical element 12. It will be appreciated, therefore, that during the stowing operation of the cowl, the actuator operates in a relatively efficient manner through the ballscrew 11-13 irrespective of a tension or compression load on the member 14.

Although in the description hereinbefore, the actuator is a single rate screw thread actuator, it will be appreciated that, if desired, the actuator could take the form of a dual rate actuator, the second member cooperating through a screw threaded connection similar to that illustrated in the accompanying drawings with a further member which is connected to the cowl and so is held against rotation. The second member is in the form of a sleeve which is free to rotate during use, the screw threaded cooperation between the sleeve and the first and third members being such that during the initial rotation of the first member, the sleeve does not rotate but translates with the third member at a relatively low rate, subsequent rotation of the first member causing the sleeve to rotate therewith and the third member to translate at a higher rate.

If desired, the motor may be arranged to drive the second member 14 rather than the first member as described hereinbefore. In such circumstances, the first member must be fixed against rotation.

The actuator, although described as being particularly suitable for use in driving a thrust reverser cowl between its stowed and deployed positions, is also suitable for use in other applications, both aerospace and non-aerospace related, and this patent application covers the use of the actuator in such applications.

What I claim is:

1. An improved rectilinear screw actuator having a longitudinal axis and omprising, first and second members mounted to one another for rotation relative to one another about said longitudinal axis, a screw thread formation in said first member including an elongate helical groove, spherical elements carried by said second member and in rolling engagement in said helical groove to define a ball-screw coupling between said first and second members whereby relative rotation of said first and second members results in relative axial movement of the members, and, a brake member carried by said second member and defining a helical screw thread formation which is received in said helical groove of the thread formation of said first member, the improvement comprising, in combination, the width of said helical groove exceeding the diameter of said spherical elements by an amount sufficient to permit movement of said elements in the direction of said longitudinal axis between opposite flanks of said groove, the width of said helical groove exceeding the width of said screw thread formation of said brake member by an amount sufficient to permit said formation of the brake member to be positioned clear of both opposite flanks of said groove, said brake member being fixed axially relative to said second member but being angularly movable relative thereto between first and second angular positions, and, said second member and said brake member being so positioned that when said brake member occupies said first angular position relative to said second member and said first and second members are rotated relative to one another to operate said actuator and the actuator consequently experiences an axial load in one axial direction, said spherical elements bear against one flank of said helical groove while said brake member screw thread formation is in close proximity to but does not bear against the opposite flank of said groove, whereby should the actuator experience a load reversal so that the actuator is axially loaded in the opposite axial direction, the second member will move axially on the first member to cause the screw thread formation of the brake member to bear on said opposite flank of said groove to brake the coupling of the first and second members, whereas when said brake member is in its second angular position relative to said second member its thread formation is clear of both flanks of said helical groove and so does not brake the coupling of said first and second members irrespective of the direction of the axial loads applied to the actuator.

2. A screw actuator as claimed in claim 1 wherein frictional drag between said first member of the actuator and said brake member ensures that the brake member is moved to its first or second angular position relative to the second member of the actuator dependent upon the direction of relative rotation of the first and second members of the actuator.

* * * * *